United States Patent [19]

Plugge

[11] Patent Number: 4,505,490
[45] Date of Patent: Mar. 19, 1985

[54] JOGGING CART

[75] Inventor: Jerome R. Plugge, Cordova, Md.

[73] Assignee: Marcel G. Talbot, Chester, Md.

[21] Appl. No.: 432,014

[22] Filed: Sep. 30, 1982

[51] Int. Cl.³ .............................................. B62C 1/08
[52] U.S. Cl. .................................. 280/63; 280/47.25; 296/31 P
[58] Field of Search ................................. 280/63-77, 280/47.25; 296/31 P; 185/15, 19, 24; 54/2, 71

[56] References Cited

U.S. PATENT DOCUMENTS

| 800,345 | 9/1905 | Varin | 280/74 |
| 885,586 | 4/1908 | Carroll | 280/63 |
| 887,133 | 5/1908 | Smith | 280/63 |
| 1,369,216 | 2/1921 | Baynes | 280/63 |
| 1,573,318 | 2/1926 | Huber | 280/63 |
| 3,549,165 | 12/1970 | Zuhlke | 296/31 P |

*Primary Examiner*—Joseph F. Peters, Jr.
*Assistant Examiner*—Joseph G. McCarthy
*Attorney, Agent, or Firm*—Brady, O'Boyle & Gates

[57] ABSTRACT

A jogging cart for exercising and training race horses includes a shell to protect the driver from the elements and from mud and debris kicked up by the horse. A very strong wheel mount is provided in conjunction with a supporting frame member for the shell which can be molded into the shell or body of the cart. A transparent windshield on the shell includes a forward gate section which may be opened. Below the gate section on the shell is a support ledge for reins. Simplicity of construction and durability are prime features of the jogging cart.

9 Claims, 8 Drawing Figures

JOGGING CART

BACKGROUND OF THE INVENTION

Racing horses, such as trotters, must be exercised and trained the year round, each day, regardless of the elements. In winter months particularly, the use of completely open vehicles subjects drivers to severe cold, wind and splashing mud.

The object of the present invention, therefore, is to provide a lightweight and economical cart for the above purpose which will offer substantial protection and comfort to the driver regardless of weather conditions without impeding the proper exercising and training of the horse.

A further object of the invention is to provide a jogging cart which does not sacrifice strength and durability because of its lightweight construction.

Another object is to provide a jogging cart which may employ a molded fiberglass body and seat in conjunction with a supporting frame member which is uniquely joined to side wheel mounts of very sturdy construction.

Other features and advantages of the invention will become apparent during the course of the following detailed description.

DETAILED DESCRIPTION

Figure 1:
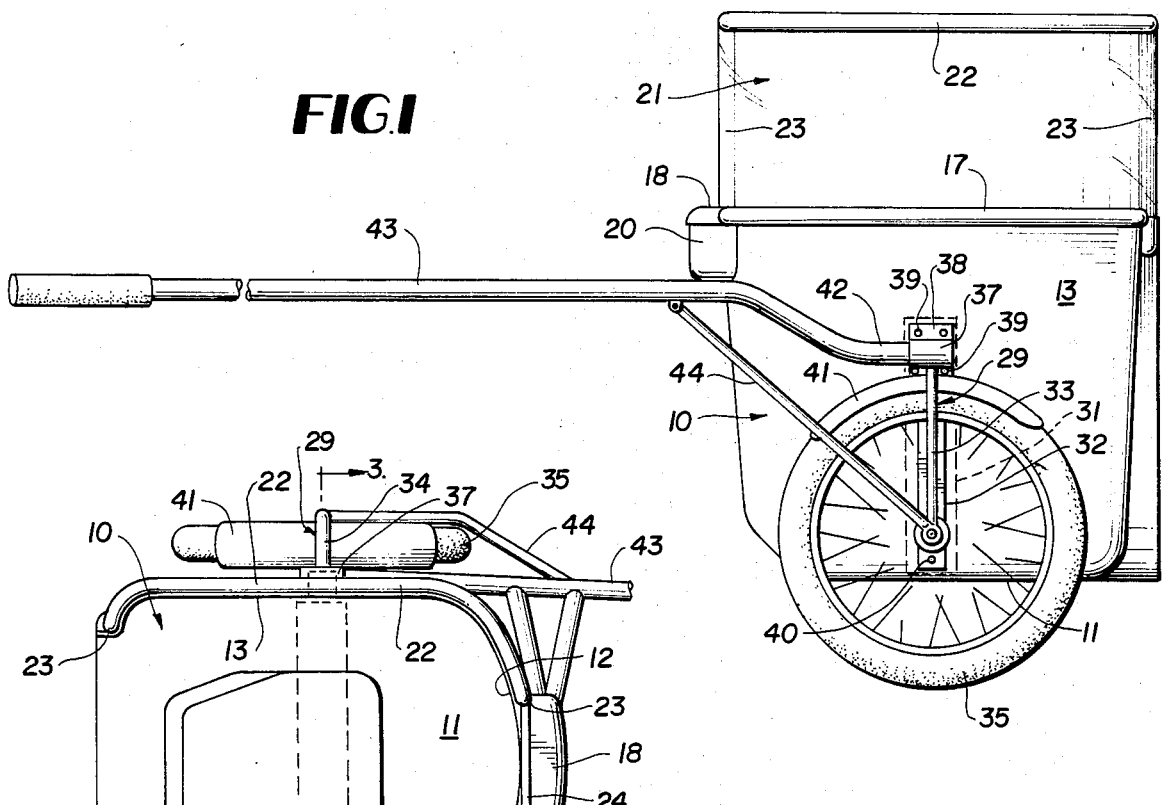
FIG. 1 is a side elevation of a jogging cart according to the invention.
Figure 2:
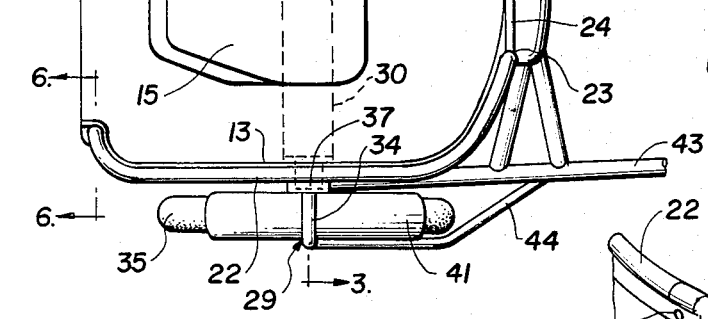
FIG. 2 is a fragmentary plan view thereof.
Figure 5:
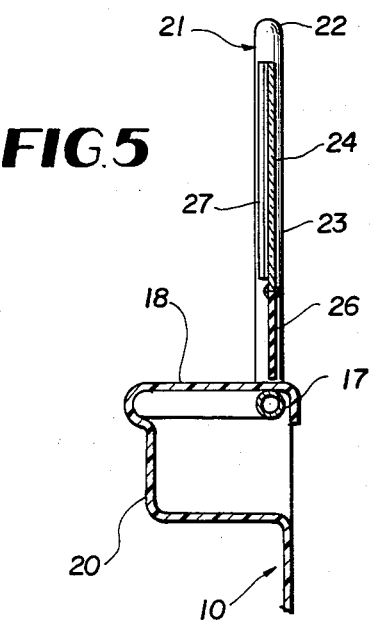
FIG. 5 is a vertical section taken on line 5—5 of FIG. 4.

Referring to the drawings in detail wherein like numerals designate like parts, a jogging cart for racing horses comprises a body or shell 10 preferably formed of molded fiberglass or other equivalent material. The shell 10 includes a level floor 11, a rounded front wall 12 and parallel vertical side-walls 13, the shell being essentially open at its rear for ready access and egress of a driver.

Arranged centrally in the molded fiberglass shell 10 and fixed to the floor 11 is a molded fiberglass seat pedestal 14, the top of which supports a molded driver's seat 15, as shown in the drawings. Preferably, the pedestal 14 has a front opening 16 enabling the storage of a hard hat or other items inside of the pedestal for convenience and safekeeping.

The upper margin of the shell 10 and the opposite vertical margins of its rear opening are bounded by aluminum tubing 17 for the sake of rigidity, strength and neat appearance.

At the top and front of the shell 10, a horizontal ledge 18 of substantial width for the sliding support of reins 19 is formed integrally on the molded shell 10 and includes an underlying support wall 20.

Figure 4:
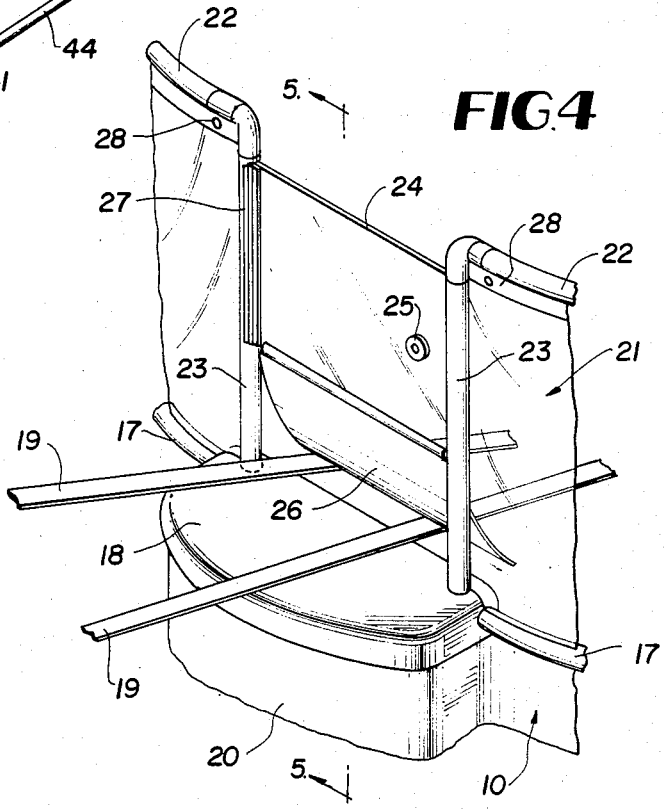
FIG. 4 is a fragmentary front perspective view of the cart.

Above the shell 10 and extending upwardly for a considerable height is a transparent windshield 21 formed of clear plastics material, such as Plexiglas. This windshield, like the shell 10, is topped by a marginal tubing frame 22 formed of aluminum. The windshield 21 is divided front and rear and the rear vertical boundaries of the two windshield sections coincide with the rear access and egress opening of the shell 10. The front vertical boundaries of the divided windshield 21, FIG. 4, are defined by vertical framing tubes 23 joined to the upper tubing frame 22 and firmly anchored to the ledge 18.

Figure 3:
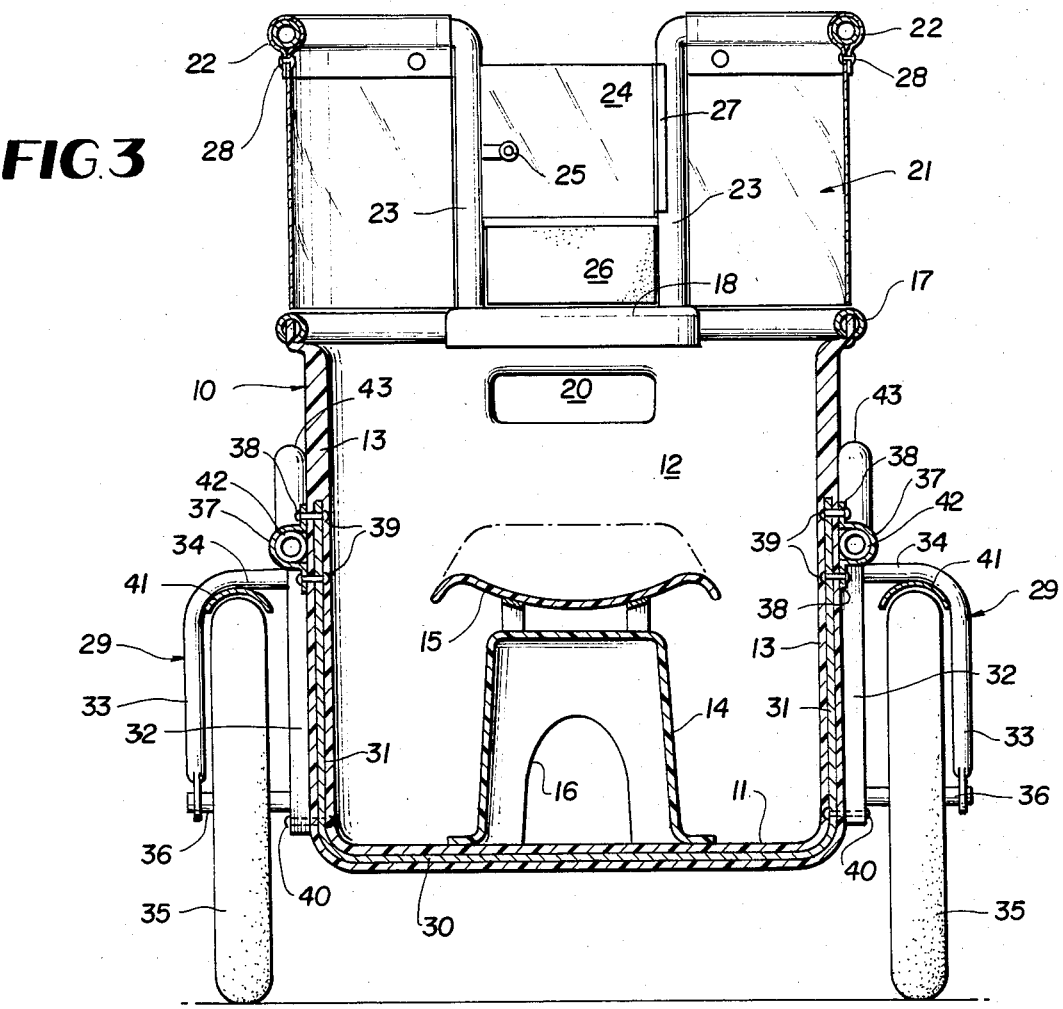
FIG. 3 is an enlarged transverse vertical section taken on line 3—3 of FIG. 2.
Figure 6:
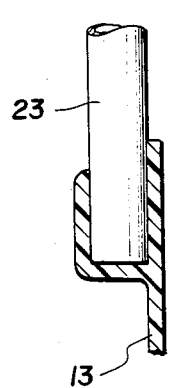
FIG. 6 is an enlarged fragmentary vertical section taken on line 6—6 of FIG. 2.
Figure 7:
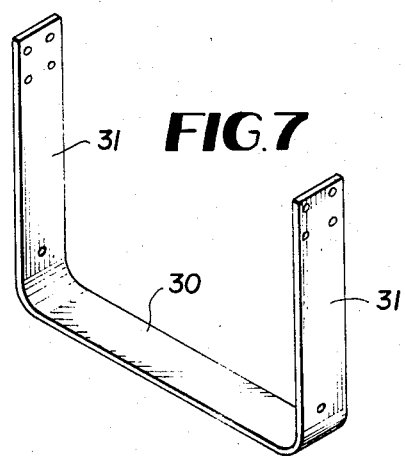
FIG. 7 is a perspective view of a shell or body supporting frame member.
Figure 8:
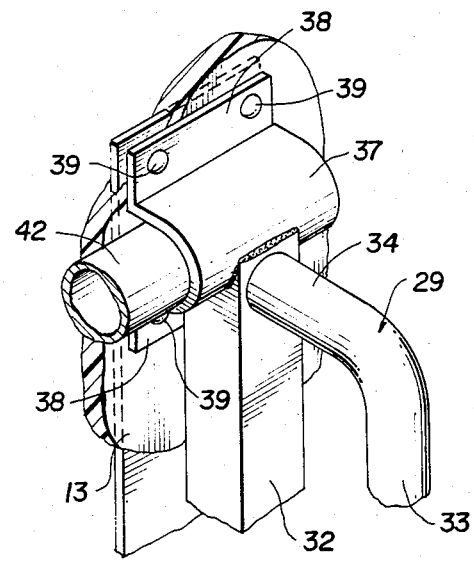
FIG. 8 is an enlarged fragmentary perspective view of a wheel mount and associated elements.

A passageway is thus provided at the front of the windshield 21 above the reins support ledge 18. A hinged transparent gate 24 is provided in this passageway and includes a suitable latch 25 for securing the gate in a closed position. The lower edge of the hinged gate carries a depending flexible mud flap 26 of rubberlike material whose lower edge terminates substantially flush with the ledge 18. The flap prevents mud and the elements from entering the vehicle when the gate 24 is closed, without interfering with the control of the reins 19 by the driver of the cart. The gate 24 may have a living hinge 27 for the sake of simplicity and economy of construction. The transparent windshield panels are secured to the upper frame 22 by suitble clamping means 28 as best shown in FIG. 3. It may be seen that the shell and windshield of the jogging cart is constructed to provide maximum comfort and protection for the driver in all seasons without adding substantial weight or manufacturing cost to the cart.

A significant feature of the invention lies in the provision of a pair of very strong side wheel mounts 29 in concert with a strong supporting frame member or strap 30 for the shell 10. The metal strap 30, which is U-shaped, spans the floor of the shell 10 transversely near its longitudinal center and its two vertical arms 31 extend substantially up the two side walls 13 to points above the wheel mounts 29. Preferably, the support strap 30 is molded within the side walls and floor of the fiberglass shell, and is thus concealed from view.

Each wheel mount consists of an interior vertical mounting bar 32 of very sturdy construction and a parallel outer bar 33 having its top rigidly anchored to the bar 32 through a short horizontal extension 34. The two conventional wheels 35 of the jogging cart are held on short axles 36 mounted between the lower ends of bars 32 and 33. These wheel axles do not penetrate the shell 10 and are disposed exteriorly thereof.

The tops of mounting bars 32 have semi-circular caps 37 fixed thereto as by welding. The flanges 38 of caps 37 are securely anchored by fasteners 39 to the arms 31 of metal strap 30, these fasteners penetrating the vertical side walls 13 of the fiberglass shell. Similar fasteners 40 are preferably provided at the bottoms of mounting bar 32 to further anchor the latter to support strap 30 for additional security. Fenders 41 for the wheels 35 are preferably provided and these may be attached to the wheel mounts 29 in any preferred way.

The caps 37 of wheel mounts 29 serve a dual purpose by receiving and firmly anchoring the rear end portions 42 of customary flanking shafts 43 which extend forwardly of the shell 10 in a conventional manner and receive the horse between them. Braces 44 extend between the two shafts 43 and wheel mounts 29 as indicated in the drawings.

It can be seen that the driver's shell 10 is safely and securely supported through the metal strap 30 which is embedded in the walls of the shell and anchored through the fasteners 39 and 40 to the very strong wheel mounts 29.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a jogging cart, a driver's shell having a driver access and egress opening and including side walls and a floor, wheel mounts on opposite sides of said shell exteriorly of said side walls, a support strap for the shell extending across the floor of the shell and upwardly along the side walls of the shell for substantial distances, and fastener means rigidly interconnecting opposite sides of the support strap with the wheel mount, each said wheel mount further including an interior substantially vertical mounting bar substantially engaging the exterior face of one shell side wall and including a parallel exterior bar, a single wheel supported and journaled on each mount between the interior and exterior bar, and wherein said fastener means connects the interior mounting bar of each wheel mount with one side wall of the shell.

2. In a jogging cart as defined in claim 1, said shell being formed of molded plastics and said support strap being encased within the plastics material forming the shell and being substantially concealed therein.

3. In a jogging cart as defined in claim 1, and a substantially half-round cap secured to the top of each interior mounting bar, said fastener means including fastener elements interconnecting flanges of said cap to one side of the support strap, and flanking shafts for propelling the jogging cart having rear end portions on opposite sides of the shell engaging within and secured by said half-round caps.

4. In a jogging cart as defined in claim 1, a divided windshield for the cart rising from the shell on opposite sides thereof and having a front opening, a horizontal ledge on the shell at its front and top adjacent to the bottom of the windshield for the controlled support of reins, and a hinged gate within the front opening to allow closing of the opening and having a depending flexible flap whose lower edge terminates near the level of said ledge, whereby said reins can be manipulated without interference while said gate and flap protect the driver of the cart within the shell.

5. In a jogging cart as defined in claim 1, and a driver's seat within the shell including a pedestal rising from the floor of the shell.

6. In a jogging cart as defined in claim 2, and the support strap comprising a unitary substantially U-shaped metal strap.

7. In a jogging cart as defined in claim 4, and said shell and said windshield having reinforcing frames at least around their top margins.

8. In a jogging cart as defined in claim 2, and said shell being formed as a unit from fiberglass.

9. In a jogging cart as defined in claim 1, and said shell comprising a molded unit including a rounded front wall and said access and egress opening being at the rear of the shell across a major portion of its width.

* * * * *